US012737017B2

(12) United States Patent
Shelley et al.

(10) Patent No.: US 12,737,017 B2
(45) Date of Patent: Sep. 15, 2026

(54) SIGNAL TAP FACEPLATE ALIGNMENT

(71) Applicant: TECHNETIX B.V., Veenendaal (NL)

(72) Inventors: Gareth Shelley, Veenendaal (NL); Paul Chapman, Veenendaal (NL)

(73) Assignee: TECHNETIX B.V., Veenendaal (NL)

( * ) Notice: Subject to any disclaimer, the term of this patent is extended or adjusted under 35 U.S.C. 154(b) by 198 days.

(21) Appl. No.: 18/780,437

(22) Filed: Jul. 22, 2024

(65) Prior Publication Data

US 2025/0060798 A1 Feb. 20, 2025

(30) Foreign Application Priority Data

Aug. 17, 2023 (GB) ..................................... 2312551

(51) Int. Cl.
*G06F 1/18* (2026.01)

(52) U.S. Cl.
CPC ................................... *G06F 1/181* (2013.01)

(58) Field of Classification Search
CPC ............. G06F 1/181; H04Q 1/02; H04N 7/10
See application file for complete search history.

(56) References Cited

U.S. PATENT DOCUMENTS

| | | | | |
|---|---|---|---|---|
| 4,791,530 | A * | 12/1988 | Kalvaitis | H02B 1/14 361/600 |
| 8,410,382 | B2 * | 4/2013 | Yuasa | B66B 1/462 200/341 |
| 9,351,414 | B1 | 5/2016 | Tatem et al. | |
| 2003/0150636 | A1 * | 8/2003 | Martir | H02B 1/06 174/66 |
| 2004/0187163 | A1 | 9/2004 | Chang et al. | |
| 2004/0238197 | A1 * | 12/2004 | Gates, II | H02G 3/14 174/53 |
| 2006/0041919 | A1 | 2/2006 | Tokunaga et al. | |
| 2014/0017919 | A1 | 1/2014 | Kelley et al. | |
| 2019/0103686 | A1 * | 4/2019 | Wilson | H01R 12/718 |
| 2020/0328583 | A1 * | 10/2020 | Guthmiller | H02G 1/00 |

FOREIGN PATENT DOCUMENTS

| | | | |
|---|---|---|---|
| CN | 212343961 | U | 1/2021 |
| KR | 20190000485 | U | 2/2019 |
| WO | 9634428 | A1 | 10/1996 |

* cited by examiner

*Primary Examiner* — Timothy J Thompson
*Assistant Examiner* — Aditya Sharma
(74) *Attorney, Agent, or Firm* — SZDC Law PC

(57) ABSTRACT

The invention provides a faceplate for a network signal distribution tap, the faceplate being adapted and configured for removable attachment to a tap back box, the faceplate comprising a guide element of suitable dimensions and positioning to prevent the faceplate from being offered up to the back box at a significant deviation from perfect alignment; and a signal distribution tap comprising the faceplate of the invention.

13 Claims, 4 Drawing Sheets

SIGNAL TAP FACEPLATE ALIGNMENT

This application claims priority to United Kingdom Patent Application No. 2312551.1, filed on Aug. 17, 2023, which is incorporated by reference for all purposes as if fully set forth herein.

FIELD OF THE INVENTION

The present invention relates to a faceplate for a broadband signal distribution tap of the sort used in cable television and broadband networks; a signal distribution tap comprising the faceplate of the invention; a method of making the faceplate; and a method of making an operable signal distribution tap by attaching the faceplate of the invention to a signal distribution tap back box.

BACKGROUND OF THE INVENTION

Signal distribution taps are used in cable television (CATV), broadband and other communications networks to connect the networked services to subscriber homes.

A signal distribution tap comprises a back box and a faceplate. The back box component is essentially permanently-connected to the network, whilst the faceplate is attachable to, and removable from, the back box. The signal distribution tap incorporates a coupler circuit that divides the signal between the output and an internal splitter circuit, which subsequently divides the remaining signal equally between (typically) 2, 4 or 8-way "tap" outputs that connect to subscriber premises via coaxial cables. The faceplate and back box connect electrically via two internal connectors (one for signal in, and one for signal out).

In a CATV or broadband network the taps are cascaded together, with the output of one tap connected to the input of the next in the chain (see FIG. 1). To extend the reach of the network, amplifiers are positioned throughout the chain to boost the signal.

Each tap back box contains a mechanically-switched "bypass" circuit that connects (via a "power pass bar" or similar) the tap output to the tap input when the faceplate is removed, thus maintaining power and signal to the rest of the network downstream of the tap. It is important that this switch, referred to as a "Make Before Break" (MBB) switch, engages before the faceplate is disconnected and disengages only after the faceplate is fully installed, so as to maintain signal and power continuity to all downstream equipment. Any interruption to the network power may cause downstream amplifiers to switch off and then have to go through a time-consuming reset procedure, during which signal to the connected subscribers is temporarily blocked.

It is difficult and time-consuming to replace the tap back boxes once installed in the network and this also causes the signal to all downstream subscribers to be interrupted when it occurs, hence network operators prefer, if possible, to replace only the tap faceplates rather than the entire tap.

As technology has advanced, the frequency band over which over which CATV or other signals are transmitted has increased, which has required the upgrading of the tap faceplates. The faceplate circuits and components have become more complex and in some cases the faceplates have increased in depth to accommodate larger and/or more numerous components.

There are several manufacturers of distribution taps with different back box MBB switch configurations, but regardless of the details of the tap design, for all of them it is important that the replacement faceplates always first connect to the internal connectors and only then disengage the MBB switch as the faceplate is mounted. However, particularly with the new faceplates with increased depth, it has become possible when mounting onto the back box to tilt the faceplate at an angle, such that the back box MBB switch disengages before the faceplate internal connectors fully engage, causing power and signal interruption downstream of the tap in question.

As the required top frequency at which the taps operate has increased, the physical characteristics of existing back boxes have an increasingly detrimental effect on the performance of electrical circuits within. One of the causes of this detrimental effect is the proximity of the power pass bar to the input and output connectors when the faceplate is fitted and the power pass bar is in its disconnected state. A solution to this is to physically raise the portion of the faceplate that contacts with the power pass actuator buttons in the back box (see FIGS. 4 and 5 below). This has the effect of pushing the actuator buttons further into the back box, thus causing the power pass bar to be positioned further away from the connectors and thereby reducing the negative impact it has on the performance of the tap circuits.

An unwanted consequence of the changing the actuator contact height on the faceplate is that it becomes possible, when mounting onto a back box, to tilt the faceplate at an angle such that the back box MBB switch disengages before the faceplate internal connectors fully engage, causing power and signal interruption downstream of the tap in question.

The purpose of this invention is to provide a means to ensure when a replacement faceplate is fitted, it is correctly aligned so as not to be possible for the back box bypass switch to open before the faceplate connectors engage.

SUMMARY OF THE INVENTION

In a first aspect the invention provides a faceplate for a network signal distribution tap, the faceplate being adapted and configured for removable attachment to a tap back box, the faceplate comprising guide means or guide element of suitable dimensions and positioning to prevent the faceplate from being offered up to the back box at a significant deviation from perfect alignment, and the guide element comprises one or more projections which are substantially parallel with, and depend from, a wall of the faceplate on the inner face of the faceplate, thereby in use to align with and be closely adjacent to internal wall surfaces of a back box. For present purposes the term "significant deviation" means more than a 5, 6, 7, 8, 9, 10, 12, 14, 16, 18 or even 20 degree or more deviation from perfect alignment. The deviation may be in the vertical plane, or in the horizontal plane, or in both the vertical and the horizontal planes.

The guide element needs to ensure the faceplate will not twist to a significant deviation when being mounted. Advantageously, the guide element may be formed on the inner face of one or more walls of the faceplate. Typically the guide element may be greater than 25% of the total length of an internal wall of the faceplate on which the guide element is mounted. The guide element is desirably also as high as possible (i.e. projecting from the faceplate as far as possible) so as to engage with a guiding portion of the back box as early as possible, but must also be short enough so as not to interfere with the base of the back box when the faceplate is secured in position.

Preferably the guide element is configured to interact with the back box. In one embodiment, the guide element comprises one or more (preferably a pair) of projections which typically extend away from the faceplate and towards the back box. The one or more projections may comprise a recess within which an earth spring is incorporated. Preferably the one or more projections are substantially parallel with, and depend from, a wall of the faceplate on the inner face of the faceplate (i.e. such that the projections are directed towards the back box when the faceplate is offered up to the back box during attachment of the faceplate to the back box).

The guide element may be formed of any suitably rigid material and may, for example, be substantially formed of metal or, more preferably, a suitably rigid synthetic plastics material. For simplicity, the guide element comprises projections which are conveniently substantially planar flap-like projections, but this is not essential. Typically, the dimensions of the projections will be in the range 12-16 mm high and 20-35 mm wide, but the person skilled in the art will appreciate that these dimensions may alter depending on, inter alia, the relative sizes of the back box and faceplate.

Advantageously, the guide element is positioned so as to fit reasonably snugly within the space defined within the back box when the faceplate is offered up to the back box. More especially, when the faceplate is installed, the guide element may be accommodated within the back box in close proximity to one or more walls of the back box. Conveniently, but not necessarily, the back box may comprise one or more co-operating guide features which co-operate with the guide element, so as to facilitate correct positioning and alignment of the faceplate as it is offered up to the back box during installation. Such co-operating guide features may include, for example, one or more tapered surfaces, which direct the faceplate guide element, and the faceplate generally, into correct positioning and alignment.

Where the guide element comprises a pair of projections, the pair of projections may be substantially identical, or they may be non-identical. Typically, each of the pair of projections will be positioned on a respective one of opposed side walls or opposed top and bottom walls of the faceplate. The guide element will typically extend along part of the length of each of a pair of opposed walls of the faceplate.

In another embodiment, the guide element comprises two pairs of projections, with a first pair provided on opposed side walls of the faceplate, and a second pair of projections provided on opposed top & bottom walls of the faceplate. The two pairs of projections may be identical, or may be non-identical.

In a third embodiment, the guide element comprises at least one pair of projections, with the projections being located at diagonally opposed corners of the faceplate, each of the pair of projections extending partially along one side wall and partially along a top or bottom wall of the faceplate.

The guide element may comprise one or more (preferably a pair of) substantially continuous flaps, or the flaps may comprise a recess, partition or other type of discontinuity within which another component (especially, an earth contact spring) may be incorporated. Such sprung metal earth contact springs, typically 3 mm-5 mm wide, provide electrical continuity between the faceplate and the back box before the signal and power connection is made, thus preventing risk of electrical shock.

In a second aspect, the invention provides a distribution tap comprising the faceplate of the first aspect of the invention, in operable relationship with a tap back box. As is well-known to those skilled in the art, the faceplate is preferably removably attached to the back box. A convenient manner of effecting such removable attachment is to use one or more screw-threaded engagements to attach the faceplate to the back box.

In a third aspect the invention provides a method of making the faceplate of the first aspect of the invention, the method comprising the step of forming a distribution tap faceplate, the faceplate comprising guide element as aforesaid. The faceplate may otherwise be essentially conventional.

In a fourth aspect, the invention provides a method of making an operable distribution tap by operably attaching the faceplate of the invention to a signal distribution tap back box.

The invention will now be further described by way of illustrative embodiment and with reference to the accompanying drawing figures in which.

DETAILED DESCRIPTION OF AN EMBODIMENT OF THE INVENTION

Figure 1:
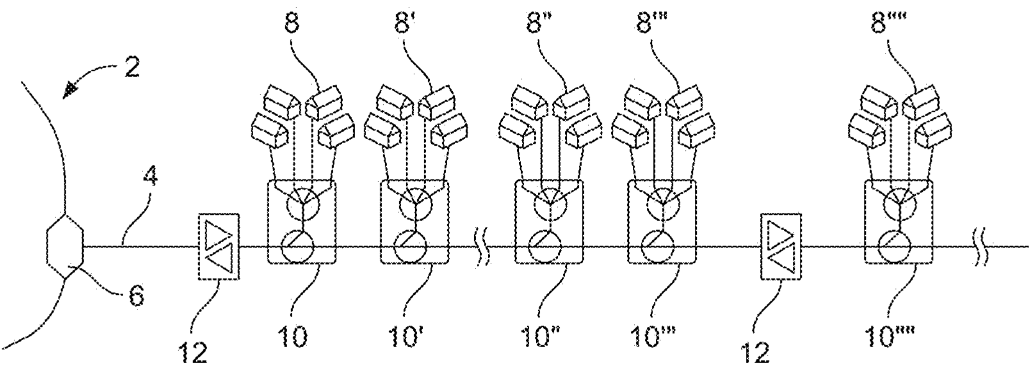
FIG. 1 is a schematic representation of a conventional cable TV network, incorporating a plurality of taps.

FIG. 1 is a schematic representation of part of a typical cable TV network. The network (indicated generally by reference numeral 2) comprises a coaxial cable 4 which carries the TV signal from a local distribution node 6, to a plurality of network users or subscribers 8-8"", via one or more of the intervening signal distribution (4-way) tap components 10-10"". In order to provide the signal to each of the users or subscribers, the signal is split at each of the tap components. The taps are in a cascade, with the output of tap 10 connected to the input of tap 10', and the output of tap 10' connected to the input of tap 10", and so on. Each tap 10-10"" also has a plurality of signal outputs which provide equal parts of the split signal to each of the users attached to the particular tap. The network also comprises a plurality of signal amplifiers 12 which ensure the users or subscribers receive a sufficiently strong signal via the network 2.

Figure 2:
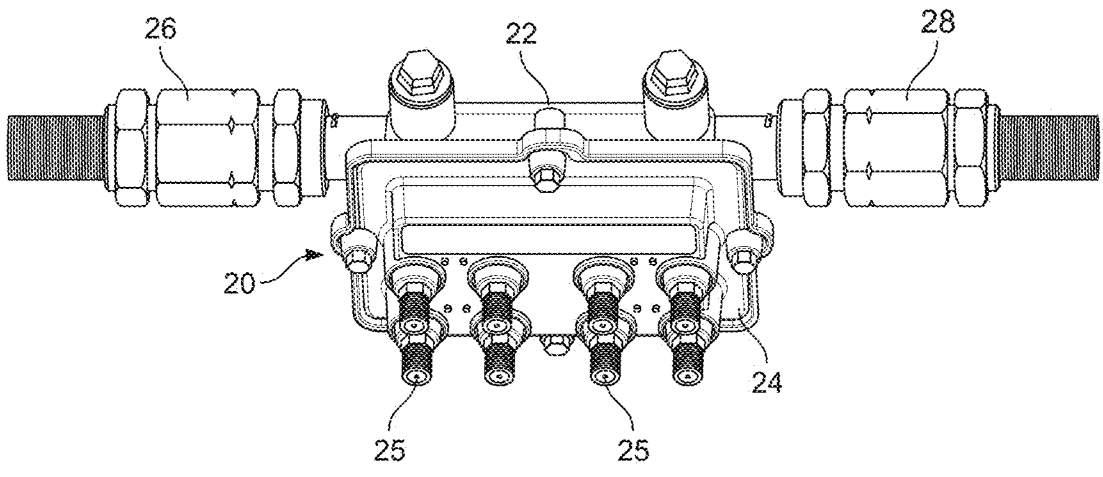
FIG. 2 shows a conventional prior art distribution tap, with input and output connections, of the sort used in a typical cable TV network, the tap comprising an 8-way 1.8 GHz tap faceplate.

FIG. 2 is a perspective view of a conventional 8-way tap 20, of the sort which may be used in the network 2 shown in FIG. 1. The tap comprises an essentially permanently fixed back box 22, and a readily removable faceplate 24, attached to the back box by a plurality of screws. (Both the back box 22 and the faceplate 24 are of conventional design). The faceplate 24 may be thus easily removed from the back box to permit access to the interior components of the tap for repair or maintenance and to permit upgrades to the tap by installation of a new faceplate with upgraded components and/or functionality. The tap 20 has a network input connection 26 and a network output connection 28, respectively connecting the tap to upstream and downstream components in the network 2. Finally, the faceplate 24 comprises a plurality of (in this instance eight) connectors 25 for connecting to individual users of, or subscribers to, the network 2.

Figure 3:
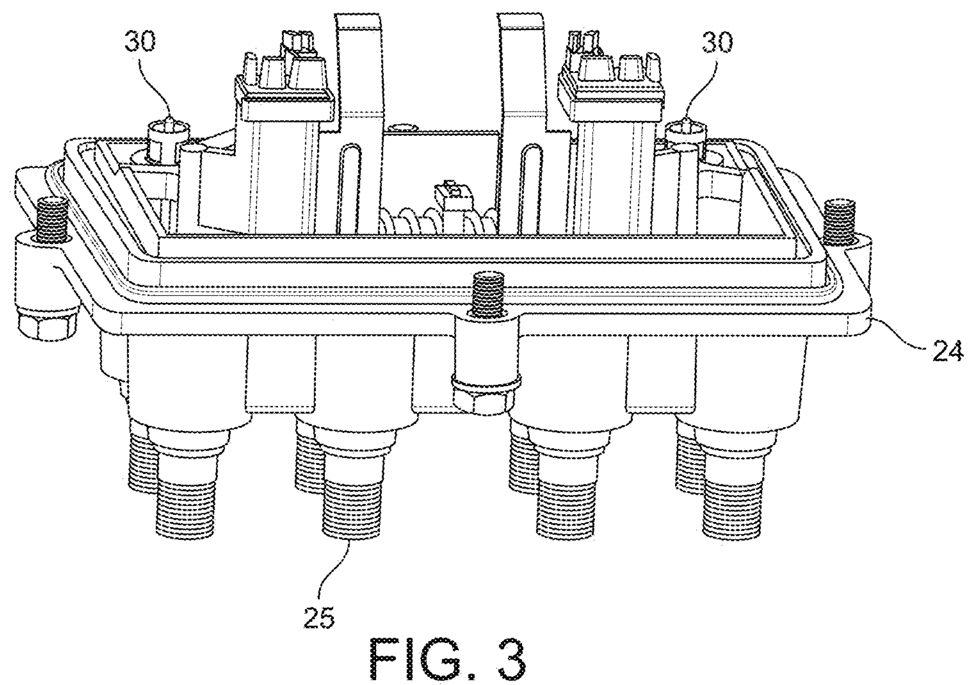
FIG. 3 shows a perspective view of the faceplate of a conventional prior art signal distribution tap, removed from the back box, to expose the connectors for connecting the faceplate to the back box.

FIG. 3 is a perspective view of the faceplate 24 from the tap depicted in FIG. 2, removed from the back box and inverted, to show the interior components of the faceplate and, in particular, the pair of connectors 30 for making electrical connections between the faceplate 24 and the back box 22.

Figure 4:
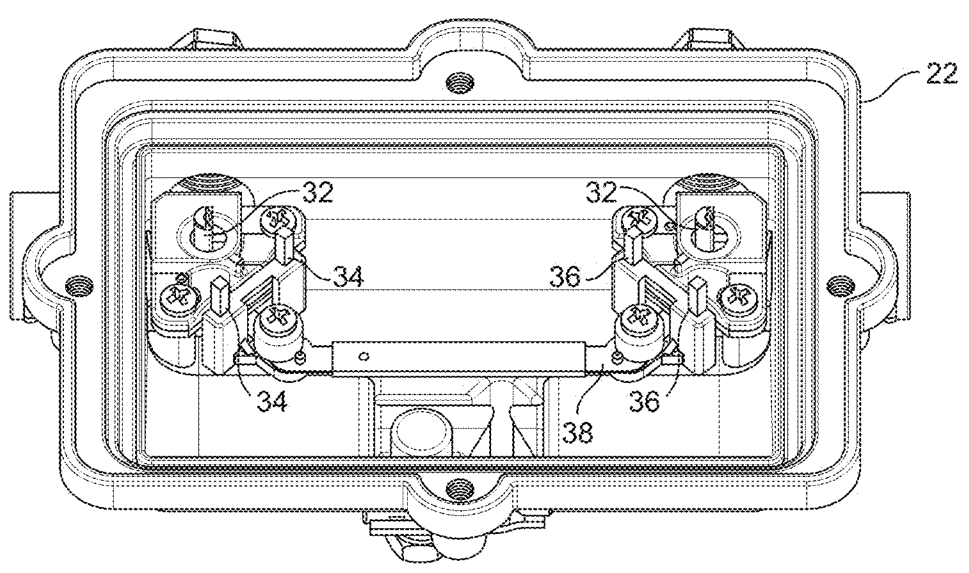
FIG. 4 is a perspective view, of the conventional prior art back box (with the faceplate removed), showing various electrical components mounted on the back box.

FIG. 4 is a perspective view of the back box 22, from the tap depicted in FIG. 2, with the faceplate removed, such that the interior components of the back box are visible. These include, in particular, a pair of connectors 32 for making electrical connection with the connectors 30 of the faceplate 24 shown in FIG. 3. Also visible are two pairs of bypass switch activator buttons 34, 36 and a power pass connection bar 38, disposed between the bypass switch actuator buttons 34, 36.

When the faceplate is removed from the back box, the actuator buttons 34, 36 that are held depressed, either by the connector supports (or by a PCB in older designs), are released and the power pass connection bar 38 contacts the bottom of the input and output connectors, thus allowing power and signal to flow through the tap to the output and onto the downstream side of the network uninterrupted when the faceplate is removed.

Figure 5:
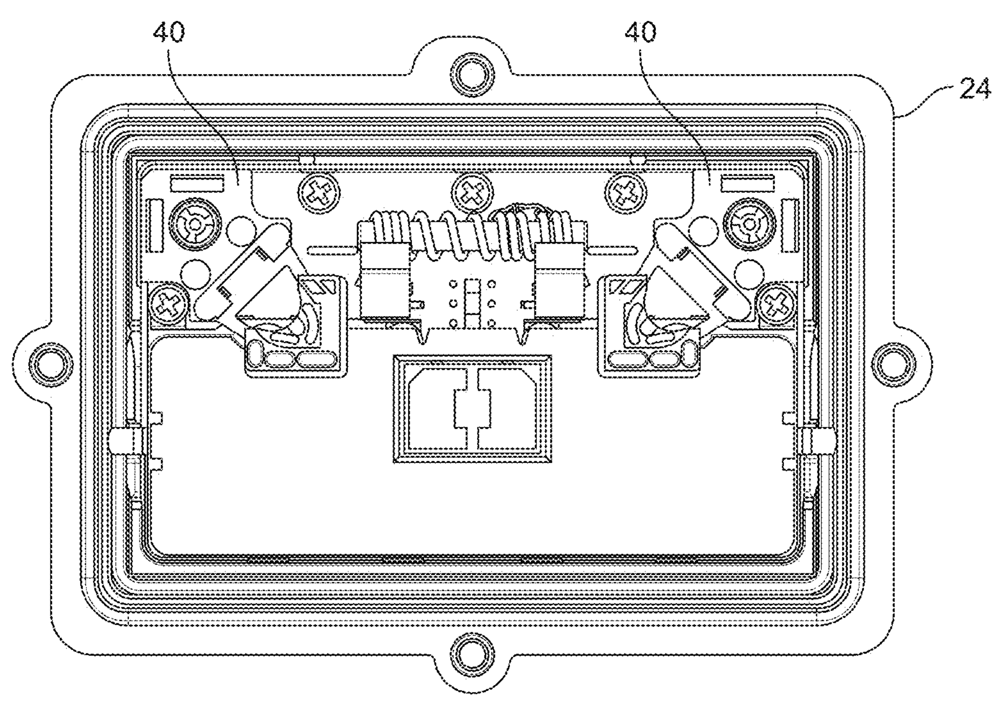
FIG. 5 is a plan view of the reverse (inner) side of the conventional prior art faceplate.

FIG. 5 is a plan view of the reverse (inner) side of a conventional faceplate. The drawing shows the two pairs of actuator contacts 40 which, when the faceplate is correctly attached to the back box 22, depress the actuator buttons 34, 36.

The Applicant has found that, with conventional designs of faceplate of the sort described above, when the faceplate is being fitted, it is possible to position the faceplate, as it is being offered up to the back box, such that the actuator buttons may be depressed before the internal electrical connectors make contact. This may happen especially if the faceplate is not in good alignment with the back box e.g. if the faceplate is tilted in a vertical and/or horizontal plane relative to the back box. The present invention is aimed at reducing or eliminating this problem.

Figure 6:
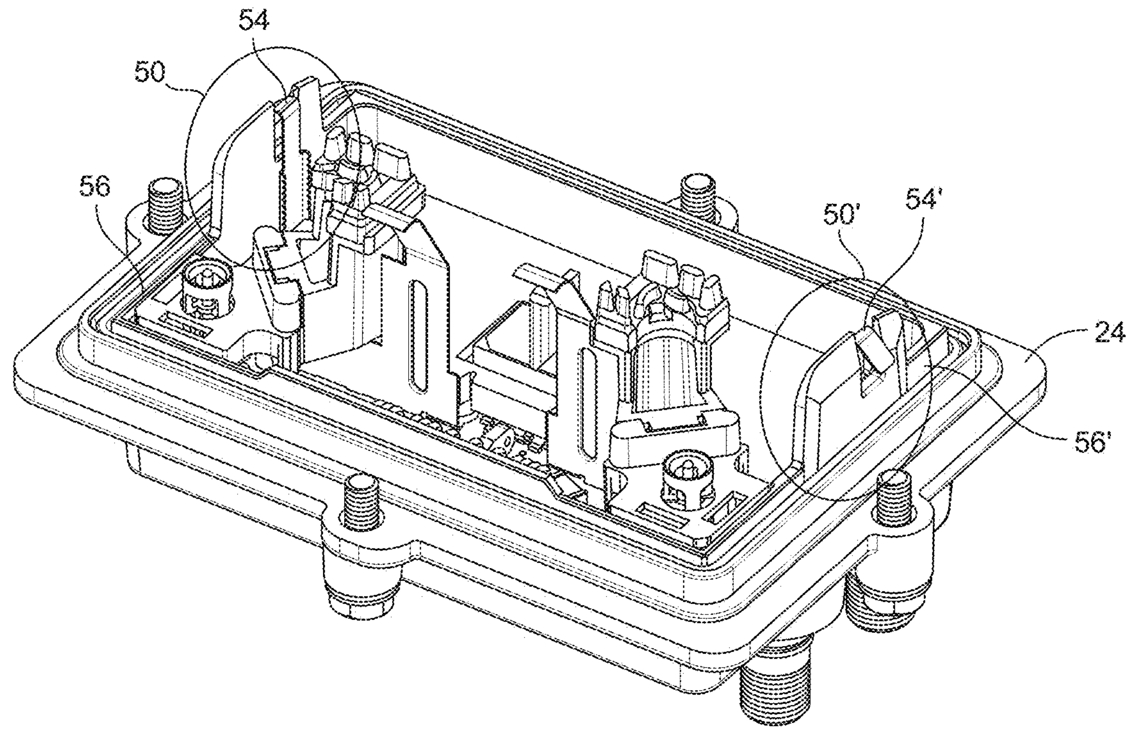
FIGS. 6 and 7 are perspective views of respective embodiments of a faceplate in accordance with the present invention.

Referring to FIG. 6, there is shown a perspective view of a first embodiment of a faceplate in accordance with the present invention. The faceplate 24 is shown inverted, so that the internal components of the faceplate are visible. These include, in particular, a guide element in the form of a pair of projections 50, 50' (circled in the figure), located on respective opposed sides of the faceplate. The projections 50,50' extend perpendicularly away from the faceplate and towards the back box, and are of suitable dimensions and positioning to prevent the faceplate from being offered up to the back box at a significant deviation from correct alignment ("significant deviation" for present purposes being more than a 5, 6, 7, 8, 9, 10, 12, 14, 16, 18 or even 20 degrees or more deviation from correct alignment). The projections take the form of substantially identical flaps substantially parallel with, and depending from, respective opposed side walls 56, 56' of the faceplate.

The projections 50, 50' each comprise a recess, within which recess is accommodated a respective earth spring connection 54, 54' formed of metal or other conductive material.

Figure 7:
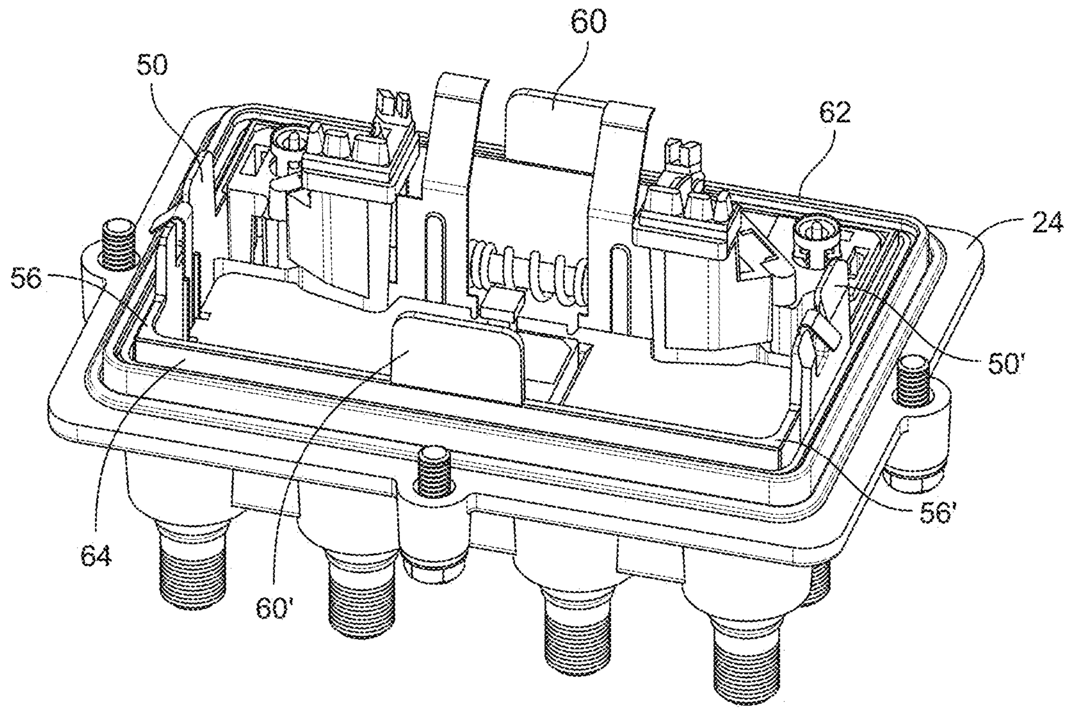

The projections 50, 50' may be formed of any suitably rigid material and may, for example, be substantially formed of metal or, more preferably, a suitably rigid synthetic plastics material. Typically, the dimensions of the projections 50, 50' will be in the range 12-16 mm high and 20-35 mm wide Referring to FIG. 7, there is shown a perspective view of a second embodiment of a faceplate in accordance with the present invention. The embodiment is substantially similar to that illustrated in FIG. 6, and equivalent components are indicated by common reference numerals. The embodiment shown in FIG. 7 comprises two pairs of projections: a first pair 50, 50' located on opposed side walls 56, 56' of the faceplate; and a second pair of projections 60, 60' respectively located on opposed top 62, and bottom 64, walls of the faceplate.

As is apparent from the foregoing, the guide element may be provided, inter alia, on two opposed walls, or all four walls of the faceplate, depending on the configuration of the internal connectors. Different manufacturers' back boxes have different connectors and actuator configurations and may be different shapes, but all potentially can be susceptible to the same problem.

The invention claimed is:

1. A faceplate for a network signal distribution tap, the faceplate being adapted and configured for removable attachment to a tap back box, the faceplate comprising a guide element of suitable dimensions and positioning to prevent the faceplate from being offered up to the back box at a significant deviation from perfect alignment, and the guide element comprises one or more projections which are substantially parallel with, and depend from, a wall of the faceplate on the inner face of the faceplate, wherein the one or more projections comprise a recess within which an earth spring is incorporated.

2. A faceplate according to claim 1, wherein the one or more projections extend away from the faceplate and towards the back box.

3. A faceplate according to claim 1, wherein the one or more projections extend along part of the length of each of a pair of opposed walls of the faceplate.

4. A faceplate according to claim 1, wherein the one or more projections are a single pair of projections.

5. A faceplate according to claim 4, wherein each projection of the pair of projections is positioned on a respective one of opposed side walls or opposed top and bottom walls of the faceplate.

6. A faceplate according to claim 1, wherein the guide element comprises at least one pair of projections, with the projections being located at diagonally opposed corners of the faceplate, each of the pair of projections extending partially along one side wall and partially along a top or bottom wall of the faceplate.

7. A faceplate according to claim 1, wherein the guide element comprises two pairs of projections; a first pair provided on opposed side walls of the faceplate, and a second pair of projections provided on opposed top and bottom walls of the faceplate.

8. A faceplate according to claim 1, wherein the earth spring is incorporated within a partition or other type of discontinuity of the recess.

9. A distribution tap comprising a faceplate according to claim 1, removably attached in operable relationship with a tap back box.

10. A distribution tap according to claim 9, wherein the back box comprises one or more co-operating guide features which co-operate with the one or more projections so as to facilitate correct positioning and alignment of the faceplate as it is offered up to the back box during installation.

11. A distribution tap according to claim 10, wherein the co-operating guide features comprise one or more tapered surfaces, which direct the faceplate guide element, and the faceplate generally, into correct positioning and alignment.

12. A method of making a faceplate according to claim 1, the method comprising the step of forming a distribution tap faceplate, the faceplate comprising a guide element of suitable dimensions and positioning to prevent the faceplate from being offered up to the back box at a significant deviation from perfect alignment, and the guide element comprises one or more projections which are substantially parallel with, and depend from, a wall of the faceplate on the inner face of the faceplate.

13. A method of making a faceplate according to claim 12, wherein the one or more projections comprise a recess within which an earth spring is incorporated.

* * * * *